United States Patent [19]
Shorten

[11] 3,854,338
[45] Dec. 17, 1974

[54] DIRECT READING SPECIFIC GRAVITY INDICATOR

[76] Inventor: James A. Shorten, 611 W. Belmont, Chicago, Ill. 60657

[22] Filed: Aug. 3, 1973

[21] Appl. No.: 385,486

[52] U.S. Cl. ............... 73/433, 215/1 R, 215/DIG. 5
[51] Int. Cl. ............................................. G01n 9/02
[58] Field of Search ....... 73/433, 437, 32, 426, 427; 23/259; 215/1 R, DIG. 5

[56] References Cited
UNITED STATES PATENTS

| | | | |
|---|---|---|---|
| 2,230,341 | 2/1941 | Szasz | 73/426 |
| 3,246,504 | 4/1966 | Halff et al. | 73/32 |
| 3,546,947 | 12/1970 | Modin | 73/437 |

FOREIGN PATENTS OR APPLICATIONS

| | | | |
|---|---|---|---|
| 19,564 | 8/1910 | Great Britain | 73/433 |
| 925,366 | 5/1963 | Great Britain | 73/433 |

Primary Examiner—Jerry W. Myracle
Assistant Examiner—Stephen A. Kreitman
Attorney, Agent, or Firm—Wolfe, Hubbard, Leydig, Voit & Osann, Ltd.

[57] ABSTRACT

A direct reading specific gravity indicator comprising a graduated cylindrical container having an axially aligned measuring spoon attached to its closed bottom end. An eyelet is molded to the side of the cylindrical container and positioned thereon such that the container, when suspended from a flexible cord attached to the eyelet, will attain horizontal balance if a predetermined amount of either water or test material is placed on the bowl of the measuring spoon. Since the graduations on the cylindrical container are calibrated to indicate a continuous sequence of specific gravities, the specific gravity of the test material can be readily determined by simply noting the level to which the water in the cylinder rises when a measuring spoon full of water and an equal volume, by weight, of the test material are combined in the container.

7 Claims, 5 Drawing Figures

PATENTED DEC 17 1974 3,854,338

DIRECT READING SPECIFIC GRAVITY INDICATOR

DESCRIPTION OF THE INVENTION

This invention relates generally to scientific measuring apparatus and more particularly concerns an easy to use, compact device for determining the specific gravity of unknown substances.

Many persons, including prospectors, geologists, metallurgists, students and hobbyists, encounter the need to roughly determine the specific gravity of both known and unknown substances in order to discern the characteristics or identity of the particular material. While a variety of different procedures for determining specific gravity are presently available, the majority of these are cumbersome and involve the use of multistage procedures which require the use of balance scales and/or complicated and expensive electronic weighing and measuring devices. As such, they are not particularly suited for use on location in the field.

It is therefore the aim of the present invention to eliminate such disadvantages found in the prior art, and to provide a compact and easy to use device for determining the specific gravity of insoluable materials.

Accordingly, it is an object of this invention to provide a direct reading specific gravity indicator which does not require the use of separate weighing or measuring apparatus.

In addition, it is an object of this invention to provide a direct reading specific gravity indicator which is durable, inexpensive to manufacture and sufficiently accurate in its readings to enable the user to distinguish in his analysis between precious metals and worthless materials.

Other objects and advantages of the invention will become apparent upon reading the following detailed description and upon reference to the drawings, in which.

Figure 1:
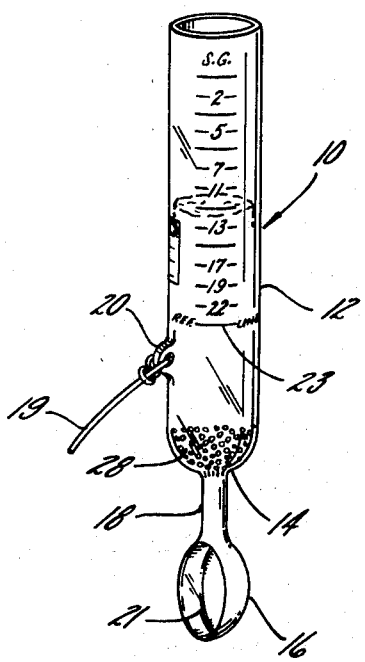
FIG. 1 is a perspective view of the apparatus of the present invention illustrating the manner in which specific gravities are indicated for direct reading with the apparatus of the present invention.
Figure 2:
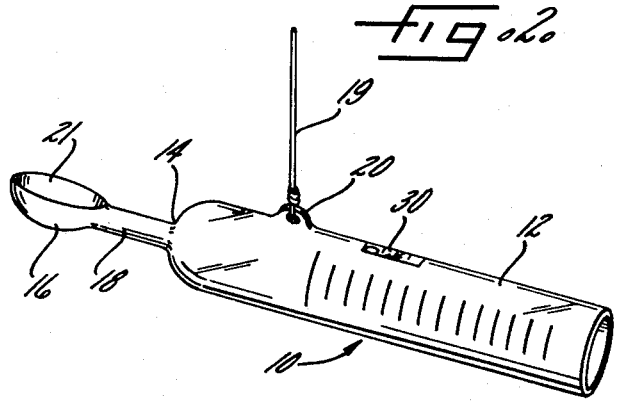
FIG. 2 is a perspective view showing the direct reading specific gravity indicator suspended from a flexible cord.
Figure 3:
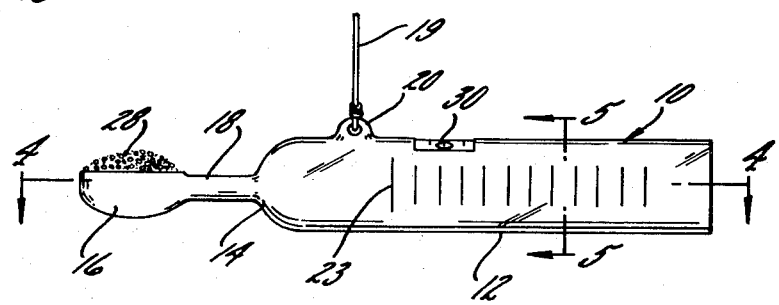
FIG. 3 is a perspective view similar to FIG. 2 showing the measuring spoon filled with a sufficient amount of test material to cause the apparatus to attain horizontal balance.
Figure 4:
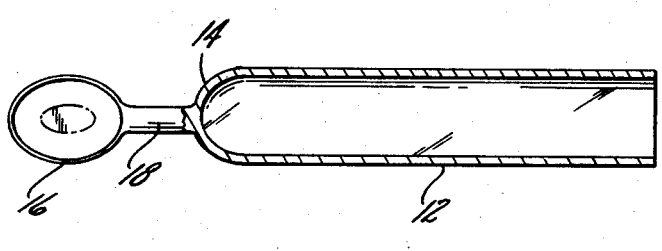
FIG. 4 is a top sectional view of the apparatus taken substantially in the plane of line 4—4 of FIG. 3.
Figure 5:
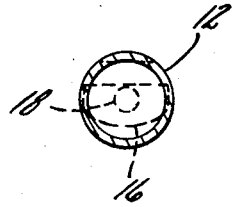
FIG. 5 is an end sectional view of the apparatus taken substantially in the plane of line 5—5 in FIG. 3.

While the invention will be described in connection with the preferred embodiment, it will be understood that it is not intended to limit the invention to that embodiment. To the contrary, it is incended to cover all alternatives, modifications and equivalents as may be included within the spirit and scope of the invention as defined in the appended claims. For example, while the illustrative embodiment described herein contemplates a small device sized to fit easily in the palm of a person's hand, it is not intended that the size of the apparatus be so limited. To the contrary, it is, in fact, recognized that more accurate readings can be attained by increasing the size of the apparatus and it is intended herein to encompass all such alternatives.

In accordance with the invention, apparatus is provided for determining the specific gravity of unknown substances by simply noting the level to which a predetermined volume of water rises in the apparatus when a premeasured amount of test material is deposited therein. To this end, the apparatus of the invention is graduated to include a plurality of spaced markings calibrated to indicate a continuous sequence of specific gravity readings falling within a predetermined range.

Referring then to the drawings, there is shown an illustrative embodiment of a direct reading specific gravity indicator 10 constructed in accordance with the present invention. The indicator comprises an opened-top, cylindrical container 12 suitably sized for holding in a person's hand and constructed of a durable, transparent material. While a wide variety of commonly available materials would be satisfactory for use in constructing the indicator 10, it is presently thought that the use of an acrylic resin would best afford the desired durability and the necessary optical qualities. Thus, it is contemplated in the preferred embodiment to construct the indicator device by an injection molding process using a plastic material such as, for example, DuPont's Lucite 147.

Attached to the closed lower end 14 of the container 12 is a spoon-like measuring device 16, seated upon a cylindrical shaft 18 which extends from the bottom of the container 12 so as to be axially aligned therewith. This spoon, as it will be seen below, enables the apparatus of the invention to function as a self contained measuring and weighing device.

To provide means for freely suspending the indicator 10 when using the measuring spoon 16, support means are provided on the cylindrical container 12. To this end, a flexible cord 19 is attached to an eyelet 20 molded to the cylindrical surface of the container 12 and positioned thereon such that the indicator 10 will attain horizontal balance when the bowl 21 of the spoon 16 is filled with water.

To enable the indicator 10 to be used in making direct readings of the specific gravities of test materials, the side of the cylindrical container 12 is calibrated at graduated, axial intervals to indicate a continuous sequence of specific gravities. The lowermost graduation 23 on the container 12 is positioned to coincide with the level to which the volume of water necessary to fill the bowl 21 of the spoon 16 would rise when emptied into the cylindrical container 12. From this reference line, the graduations are spaced at calibrated intervals so as to reflect a continuous sequence of specific gravities, with those of higher value being positioned closest to the reference line.

In keeping with this aspect of the invention, the graduation markings, which it is contemplated will be either etched or embossed onto the surface of the container 12, are based on and derived from the basic principle that the specific gravity of a material is equal to the ratio of its density compared to the density of water. As such, the specific gravity of a material is a pure number. Since the density of a homogeneous material is defined as its mass per unit volume, it becomes clear that a direct reading of specific gravity can be obtained by noting the displacement of a premeasured volume of water when an equal weight of test material is deposited therein.

In using the apparatus of the present invention, the direct reading specific gravity indicator 10 is suspended in mid-air by attaching one end of a flexible cord 19 to the eyelet 20 and tying the other end of the cord to any conveniently available stationary object such as, for example, the branch of a tree. Particles of test material 28, the specific gravity of which is to be determined, are then deposited in the bowl 21 of the spoon 16 until the indicator 10 pivots about the eyelet 20 to the extent that its transverse axis is aligned in a horizontal plane. At this point, the material 28 contained in the spoon 16 is equal in weight to the amount of water necessary to fill the cylinder 12 to the reference line 23 since, as previously stated, this line was originally calibrated to coincide with the volume of water necessary to bring the indicator 10 into horizontal balance. In measuring the test material it must be kept in mind, however, that moisture in the material itself will distort the accuracy of the specific gravity reading. Accordingly, for accurate results the material should be thoroughly dried before weighing.

Once the appropriate amount of dry test material 28 is determined, this material is removed from the measuring spoon 16 and momentarily set aside. The unit is then held upright in a vertical position and the container 12 is filled with water up to the reference line 23. Following this, the pre-weighed test material 28 is added to the water in the cylindrical container 12 and a reading of the materials specific gravity can then be taken directly from the indicator 10 by noting the level to which the water has risen within the container 12 as a result of the displacement caused by the addition of the test material 28.

Although it is recognized that the readings obtained with the indicator 10 will not be entirely accurate, those skilled in the art will appreciate that sufficiently close approximations of actual specific gravity can be obtained with the device of this invention to enable the user to proceed confidently with further analysis of the material. The advantage in this is apparent, particularly for such persons as prospectors, geologists, metallurgists, students, and hobbyists, since it will enable them to quickly and easily determine whether the substance being tested is a precious metal or a worthless material.

Finally, in a preferred construction of the invention, a bubble-type indicator level 30 is molded into the sidewall of the container 12. This facilitates the use of the device and assists the user in making an exact determination as to the amount of material necessary to cause the suspended indicator 10 to obtain perfect horizontal balance.

Thus it is apparent from the foregoing that there has been provided in accordance with the invention, a direct reading specific gravity indicator which fully satisfies the objects, aims and advantages set forth above.

What is claimed is:

1. A direct reading specific gravity indicator comprising a graduated container suitable for holding a volume of liquid, the graduations on said container being calibrated to indicate a continuous sequence of specific gravities within a predetermined range; measuring means attached to said container and sized for holding a predetermined volume of said liquid; and support means connected to said container and operatively positioned with respect to said measuring means for suspending the container in horizontal balance when either a volume of liquid equal to said predetermined volume or a volume of matter equal in weight to the weight of said predetermined volume of liquid is placed in said measuring means.

2. A direct reading specific gravity indicator as set forth in claim 1 wherein said graduated container is an opened-top cylinder constructed of transparent material.

3. A direct reading specific gravity indicator as set forth in claim 2 wherein said measuring means comprises a spoon-shaped bowl axially aligned with said cylinder and connected to the closed, bottom end thereof.

4. A direct reading specific gravity indicator as set forth in claim 3 wherein said support means comprises a flexible cord connected to an eyelet integrally molded to the outer cylindrical surface of said container.

5. A direct reading specific gravity indicator as set forth in claim 1 further comprising level indicating means for indicating when said suspended container is horizontally aligned.

6. A direct reading specific gravity indicator as set forth in claim 1 wherein the lowermost graduation indicates the level to which said predetermined volume of liquid will rise in said container.

7. A direct reading specific gravity indicator comprising an opened-top cylindrical container calibrated to indicate a continuous sequence of specific gravities at graduated, axial intervals along its outer surface; a measuring spoon attached to and extending away from one end of said cylindrical container and sized for holding a predetermined volume of liquid; and support means, including an eyelet operatively spaced from said measuring means and integrally molded to the outer cylindrical surface of said container, for suspending the container in horizontal balance when either a volume of liquid equal to said predetermined volume or a volume of matter equal in weight to the weight of said predetermined volume of liquid is placed in said measuring spoon.

* * * * *